United States Patent
Vilei et al.

(10) Patent No.: US 8,437,348 B2
(45) Date of Patent: May 7, 2013

(54) METHOD AND SYSTEM FOR CONTROLLING TRANSMISSION OF MULTICAST PACKETS OVER A LOCAL AREA NETWORK, RELATED NETWORK AND COMPUTER PROGRAM PRODUCT THEREFOR

(75) Inventors: Antonio Vilei, Lecce (IT); Gabriella Convertino, Francavilla Fontana (IT)

(73) Assignee: STMicroelectronics S.r.l., Agrate Brianza (IT)

(*) Notice: Subject to any disclaimer, the term of this patent is extended or adjusted under 35 U.S.C. 154(b) by 1177 days.

(21) Appl. No.: 11/870,983

(22) Filed: Oct. 11, 2007

(65) Prior Publication Data
US 2008/0031248 A1 Feb. 7, 2008

Related U.S. Application Data

(63) Continuation of application No. PCT/IB2005/000966, filed on Apr. 12, 2005.

(51) Int. Cl.
*H04L 12/56* (2006.01)
(52) U.S. Cl.
USPC ........... 370/390; 370/230; 370/235; 370/382; 709/204
(58) Field of Classification Search ............ 370/389, 370/390, 256, 432, 382; 709/245, 238, 204; 455/466; 710/106
See application file for complete search history.

(56) References Cited

U.S. PATENT DOCUMENTS

| | | | | |
|---|---|---|---|---|
| 6,522,650 | B1 * | 2/2003 | Yonge et al. | 370/390 |
| 6,625,773 | B1 | 9/2003 | Boivie et al. | |
| 6,671,284 | B1 | 12/2003 | Yonge, III et al. | |
| 7,894,468 | B2 * | 2/2011 | Chuah et al. | 370/449 |
| 2002/0028687 | A1 * | 3/2002 | Sato et al. | 455/466 |
| 2002/0184389 | A1 * | 12/2002 | Sherman | 709/245 |
| 2003/0103521 | A1 * | 6/2003 | Raphaeli et al. | 370/445 |
| 2005/0027801 | A1 * | 2/2005 | Kashyap et al. | 709/204 |
| 2005/0058151 | A1 | 3/2005 | Yeh | |
| 2006/0198325 | A1 | 9/2006 | Gao et al. | |
| 2007/0283026 | A1 * | 12/2007 | Lohmar et al. | 709/229 |
| 2008/0031248 | A1 | 2/2008 | Vilei et al. | |

FOREIGN PATENT DOCUMENTS

| | | |
|---|---|---|
| EP | 1178624 A2 | 2/2002 |
| JP | 200323428 | 1/2003 |
| TW | 453057 B | 9/2001 |

OTHER PUBLICATIONS

Office Action corresponding to U.S. Appl. No. 11/870,948; Examiner, Prenell P. Jones; Dated Dec. 23, 2009; 27 pages.
Gossain et al., "Supporting MAC Layer Multicast in IEEE 802.11 based MANETs: Issues and Solutions," 29th Annual IEEE International Conference on Local Computer Networks, pp. 1-8. Date: 2004.
Lehman et al., "Active Reliable Multicast," IEEE 1998, pp. 581-589.

\* cited by examiner

*Primary Examiner* — Andrew Chriss
*Assistant Examiner* — Mohamed Kamara
(74) *Attorney, Agent, or Firm* — Seed IP Law Group PLLC (57) ABSTRACT

Transmission of multicast packets over a local area network is controlled by: identifying the condition where only a single receiver exists within the local area network for a given multicast group of packets, and allowing, upon occurrence of that condition, Automatic Repeat Request of the packets multicast towards said single receiver. A preferred field of application is wireless local area networks for use in a home environment.

29 Claims, 7 Drawing Sheets

METHOD AND SYSTEM FOR CONTROLLING TRANSMISSION OF MULTICAST PACKETS OVER A LOCAL AREA NETWORK, RELATED NETWORK AND COMPUTER PROGRAM PRODUCT THEREFOR

BACKGROUND

1. Technical Field

The invention relates to techniques for controlling transmission of multicast packets over a local area network, and was developed with specific attention paid to the possible application to Wireless LAN (WLAN).

2. Description of the Related Art

A number of solutions related to multicast and wireless communications explicitly describe techniques to improve reception quality when a plurality of receivers share the same wireless channel.

Service providers offering "triple play" (data, video and voice) services usually add Internet Protocol multicast support to their routers. Services like video on demand do in fact benefit from Internet Protocol multicast arrangements, because the overall network traffic can be dramatically reduced in comparison with the unicast case.

Wireless LAN (WLAN) technology is being increasingly used in order to deliver data, video and voice in the home environment. Wireless LANs have appeared in the domestic environment mainly for sharing access to a broadband Internet connection. IEEE 802.11b running at 11 Mbps is widely used nowadays, while higher speed IEEE 802.11g at 54 Mbps is appearing.

Consumer Electronics (CE) manufacturers are interested in using a domestic wireless LAN to distribute audiovisual content among entertainment devices and Personal Computers. However, variations in the wireless link conditions in the home environment—due to propagation effects, interference, and traffic generated by other devices—cause transmission errors and packet losses. Additionally, packet transmission over wireless LAN suffers from signal attenuation as caused by walls and multipath effects in a closed environment like the home. Furthermore, as wireless equipment in the 2.4 GHz ISM band is becoming commonplace, multiple users may be sharing the same radio spectrum in an uncoordinated way, thereby producing mutual interference.

As indicated, the variations in a wireless link in a home environment, primarily due to propagation effects, interference, and traffic generated by other devices, cause packet loss, especially when using multicast transmissions. This is due to the lossy characteristics of the wireless channel, which makes it almost impossible to transmit a row of pieces of data and receive them correctly on the receiver side. In the Media Access Control (MAC) layer of IEEE 802.11, the Automatic Retransmission Request (ARQ) and the Dynamic Rate Shifting (DRS) are employed to improve channel reliability. In case of transmission errors on unicast packets, the Automatic Retransmission Request feature of the MAC layer will trigger multiple retransmissions of any erroneous packet either until this is correctly received or for a given number of times. When the channel condition becomes really poor, the Dynamic Rate Shifting feature will reduce the physical layer transmission rate in order to boost up the amount of energy transmitted per symbol.

When transmitting multicast packets over a WLAN, packet loss is more probable than in the case of unicast packets (with the same size and the same physical rate) because receiving stations cannot send back 802.11 Acknowledgments to the Access Point (AP). The 802.11 standard does in fact forbid Acknowledgment messages in the case of multicast frames. This means that multicast frames cannot be retransmitted, while unicast frames can be retransmitted.

The reason why Acknowledgments are disabled for multicast transmissions lies in the need of avoiding Acknowledgment "implosion" at the Access Point. Moreover it would be quite difficult for the Access Point to retransmit frames according to the multiple error patterns experienced by different receivers.

Thus a feasible way to reduce packet loss for multicast packets is reducing the physical rate during multicast transmissions. Lowering the physical rate can effectively increase robustness, but it causes a degradation of the aggregated throughput that can be achieved on the WLAN (bandwidth waste).

Document US-A-2002/028687 does in fact describe a retransmission control method and system for multicast information distribution service. This document describes a retransmission control method for a multicast information distribution service that distributes multicast information with respect to a plurality of wireless terminals within a service area from an information distribution apparatus via a wireless region. In particular, in a retransmission control method for a multicast information distribution service, when information, which requires retransmission, is generated, a wireless terminal transmits the retransmission request for the information to an information distribution apparatus when a timing determined for the wireless terminal is reached. The information distribution apparatus which receives the retransmission request transmits retransmission information which indicates the information requested by the retransmission request, with respect to each of the wireless terminals within the service area, and retransmits the information requested by the retransmission request at a predetermined timing.

Document US-B-6 522 650 describes a multicast and broadcast transmission with partial Automatic Retransmission Request (ARQ) in a network of devices connected to a shared transmission medium, wherein a frame is to be transmitted to a plurality of the devices. To support the partial Automatic Retransmission Request, a Media Access Control (MAC) protocol uses robustly transmitted frame delimiters and a Media Access Control management frame structure. In a multicast or broadcast frame with partial Automatic Retransmission Request, a destination address field is set to that of a selected proxy device address, and the address of the intended recipients (of group address of the intended recipients) is placed in an entry in the Media Access Control management frame structure. The frame also contains a multicast flag set to indicate that the transmission is intended for more than one device and a value in the frame delimiters to indicate that a response is requested. Upon receipt of such a frame, the proxy device specified by the destination address field provides an appropriate response type on behalf of the group. The non-proxy recipients, detecting the multicast flag setting, know to ignore the Destination Address (DA) in the destination address field and instead look to the Media Access Control management entry for actual destination addresses.

Document US-B-6 671 284 relates to a robust Media Access Control (MAC) scheme for network stations operating in an Orthogonal Frequency Division Multiplexing (OFDM) transmissions network. The Media Access Control scheme uses robustly transmitted frame control information to ensure network synchronization (for media access) and convey channel access prioritization for Quality of Service (QoS). Frame control information can occur in a frame before and after the frame payload, or in a response.

Document JP 2003 023428 relates to multicast reception station, multicast transmission station and wireless multicast communication method. The relative arrangements can suppress the interference quantity of an incoming channel to the utmost and have proper data transfer efficiency, even under-poor channel quality. The wireless multicast communication method includes a number of steps of transmission Acknowledgement (ACK), through the use of an individual physical channel from a reception station, in response to multicast data with a poll request sent through a common physical channel and a step of selecting one reception station by a transmission station for an individual poll notice, on the basis of a value Last Sequence Number (LSN) included in the acknowledgement notice and permitting retransmission request for the multicast data, to only the selected reception stations. This document specifies use of an acknowledgement (ACK) in response to multicast data with a poll request.

Document TW 453 057 relates to delegate mobile host in non-backbone wireless mobile networks. A delegate mobile host mechanism is described to achieve point-to-point transmission and multicast in a non-backbone wireless mobile network (also called "ad hoc network"). A delegate mobile host is an agent that sends and receives packets for mobile hosts in its transmission range. This reduces routing and multicast overhead in the system. When a mobile host sends packets, it sends them first to its delegate mobile host. Then the delegate mobile host transmits in turn toward the receiver. If the mobile host wants to receive packets, its delegate mobile host can receive packets for it to be passed on. The connection between the delegate mobile host and a backbone based wireless network takes a base station as a delegate mobile host and set up a connection by the methods described in the foregoing. The delegate mobile host can also be configured to be an agent of multicast subscribers in order to decrease the redundant packets.

In document US-A-2002/0184389 an 802.11 source station transmits a signal with a duration field other than the one required for the transmission. This is done with the aim of preventing transmission by other stations during known sequences. Thus, the source station uses the duration field to spoof the actual time the medium will be occupied with respect to stations within range of the signal. A station within range of the transmitted signal will check the duration field of the transmitted signal, and update the station network allocation vector. Thus, the station will not transmit because the station network allocation vector indicates that the medium is in use, even though the station may be unable to sense the carrier. Accordingly, spoofed stations may, for example:

1) delay transmission until a more critical transmission has completed,
2) allow unknown or foreign protocol to have preferential use of the medium,
3) prevent interference from hidden stations, and
4) allow sharing of the medium by overlapping basic service sets.

BRIEF SUMMARY

The object of the invention is thus to provide an improved, simplified solution to the problems mentioned in the foregoing.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the arrangement described herein is thus a method of controlling transmission of multicast packets over a local area network, including the steps of:
  identifying the condition where only a single receiver exists within said local area network for a given multicast group of packets, and
  allowing, upon occurrence of said condition, Automatic Repeat Request (ARQ) of the packets multicast towards said single receiver.

Essentially, the solution described herein proposes a technique to reduce packet loss for multicast transmissions when in a WLAN there is just a single receiver for a given multicast group. This solution allows Automatic Retransmission Request (i.e., Acknowledgements and Medium Access Control layer retransmissions) also for multicast packets without causing any Acknowledgement implosion problem. The key point underlying such an arrangement lies in allowing Acknowledgements for multicast packets if and only if in the network, such as, e.g., an Infrastructure 802.11 Basic Service Set (BSS) there is just one single receiver for a given multicast group.

The solution described herein is more bandwidth efficient than the methods that employ a physical layer (PHY) rate reduction. In fact, if the bit error rate is below a given threshold, the Automatic Retransmission Request method can effectively reduce the overall channel utilization compared to the physical rate reduction mechanism, thus achieving a higher aggregated throughput for the whole WLAN.

This technique can be integrated in Media Access Control implementations to reduce multicast packet loss and increase channel utilization efficiency, thereby providing product differentiation with respect to standard WLAN equipment.

The solution can be implemented in existing 802.11 chipsets (e.g., in the chipset currently available from the assignee company as the STMicroelectronics Mercury™ chipset), by updating the Medium Access Control firmware. In this way, cost investment of customers is preserved: there is no need to buy new hardware to exploit the benefits of this solution.

BRIEF DESCRIPTION OF THE SEVERAL VIEWS OF THE DRAWINGS

The invention will now be described, by way of example only, with reference to the enclosed figures of drawing, wherein.

DETAILED DESCRIPTION

Figure 1:
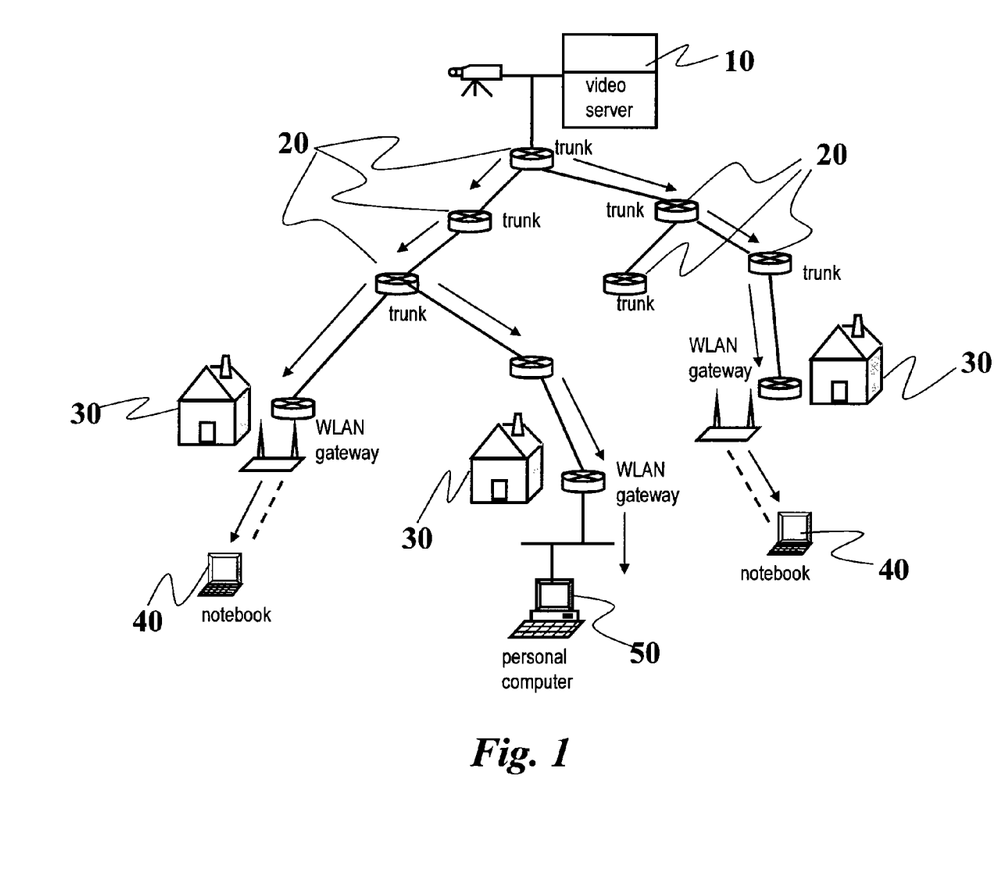
FIG. 1 shows a typical exemplary scenario of possible application of the solution described herein.

FIG. 1 shows an exemplary WLAN scenario wherein the solution described herein can be applied. Specifically, reference 10 designates a video server transmitting multicast video. Reference 20 designates trunks of a service provider's backbone, while reference 30 designates a digital subscriber line WLAN gateway in home environment. Reference 40 designates some notebook receiving multicast video via 802.11, and finally reference 50 designates a personal computer receiving multicast video via the Ethernet.

In such a WLAN scenario as applied and used in a domestic environment, it is highly likely that there will be just one single WLAN receiver interested in a given video transmitted by a service provider to an Internet Protocol multicast group. Similarly, it is highly likely that in a home there will be just one single WLAN device involved in a multicast audio/video conference.

This means that, even if there are many receivers of an Internet Protocol multicast packet, a substantial likelihood exists that in a given WLAN used in a home environment there will be just one single receiver for that packet.

With just one WLAN receiver for a given multicast group, the Automatic Retransmission Request feature can be advantageously applied rather than reducing the transmission physical rate. In fact, if the bit error rate is below a given threshold, the Automatic Retransmission Request is much more efficient than the physical rate reduction.

The 802.11 standard does not properly provide any mechanism to enable the Automatic Retransmission Request for multicast packets in this special, but quite common, case (i.e., just one receiver for a given multicast group within a WLAN).

The solution described herein provides a bandwidth efficient mechanism to reduce packet loss for multicast transmissions when in a WLAN there is just a single receiver for a given Internet Protocol multicast group (typical of audio/video distribution in domestic environments).

The 802.11 standard forbids Acknowledgment for multicast packets in order to avoid Acknowledgment implosion at the Access Point (AP). This solution allows the Automatic Retransmission Request (i.e., Acknowledgments and Medium Access Control layer retransmissions) also for multicast packets without causing Acknowledgment implosion problem.

The main idea of this solution is allowing Acknowledgments for multicast packets if and only if in an Infrastructure 802.11 Basic Service Set (BSS) as shown in FIG. 1 there is just a single receiver for a given multicast group.

Let the Multicast Station (MSTA) and the Multicast Access Point (MAP) be respectively an 802.11 Station and an 802.11 Access Point implementing this solution.

For the sake of direct reference to FIG. 1, the Multicast Access Point (MAP) will be assumed to correspond to any of the Digital Subscriber Line WLAN gateways 30, while the 802.11 receiving station will be assumed to correspond to any one of the notebooks 40 or Personal Computers 50.

The Multicast Station knows the list of the Media Access Control multicast addresses to receive, because this information comes from the host operating system.

Figure 4:
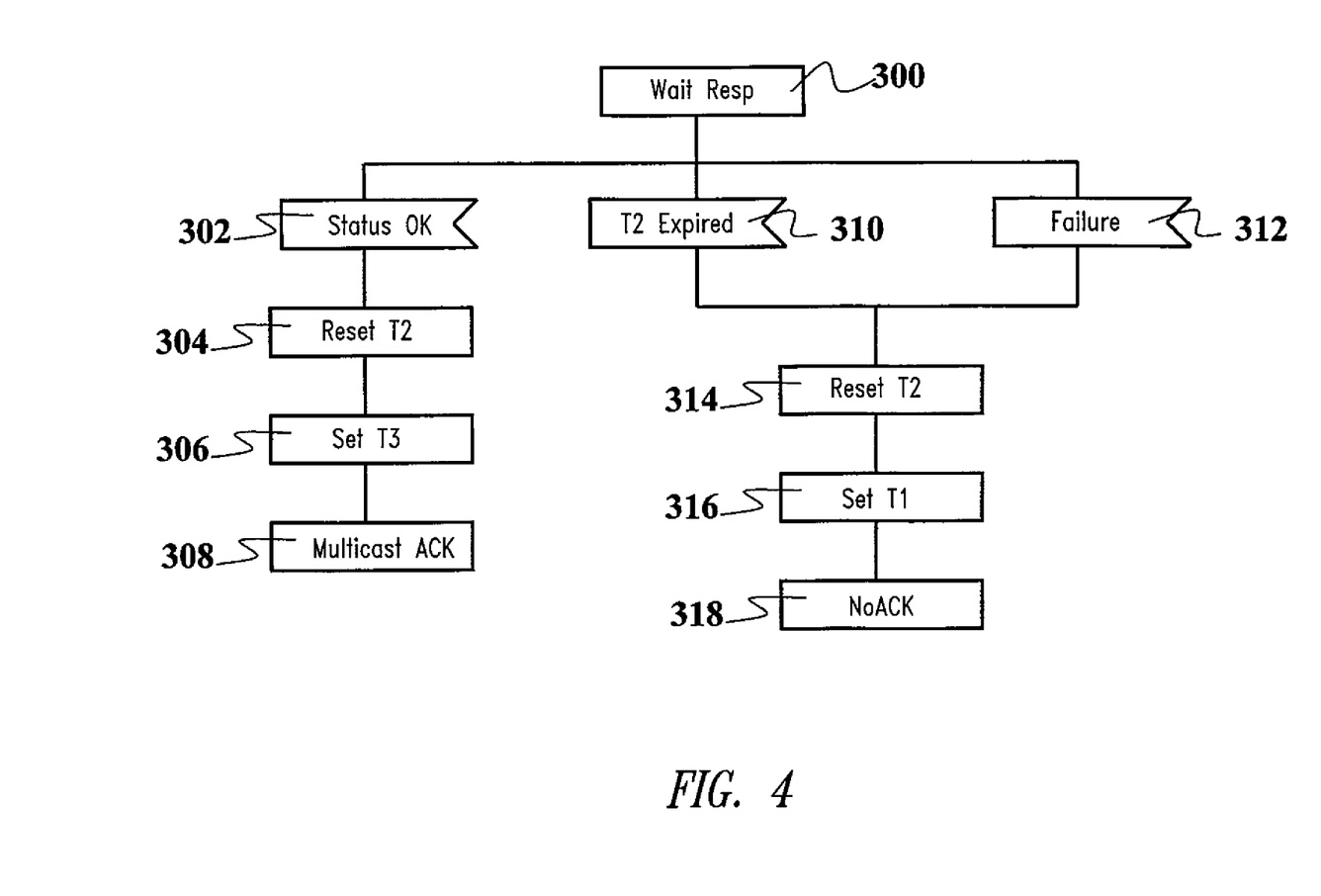
Figure 5:
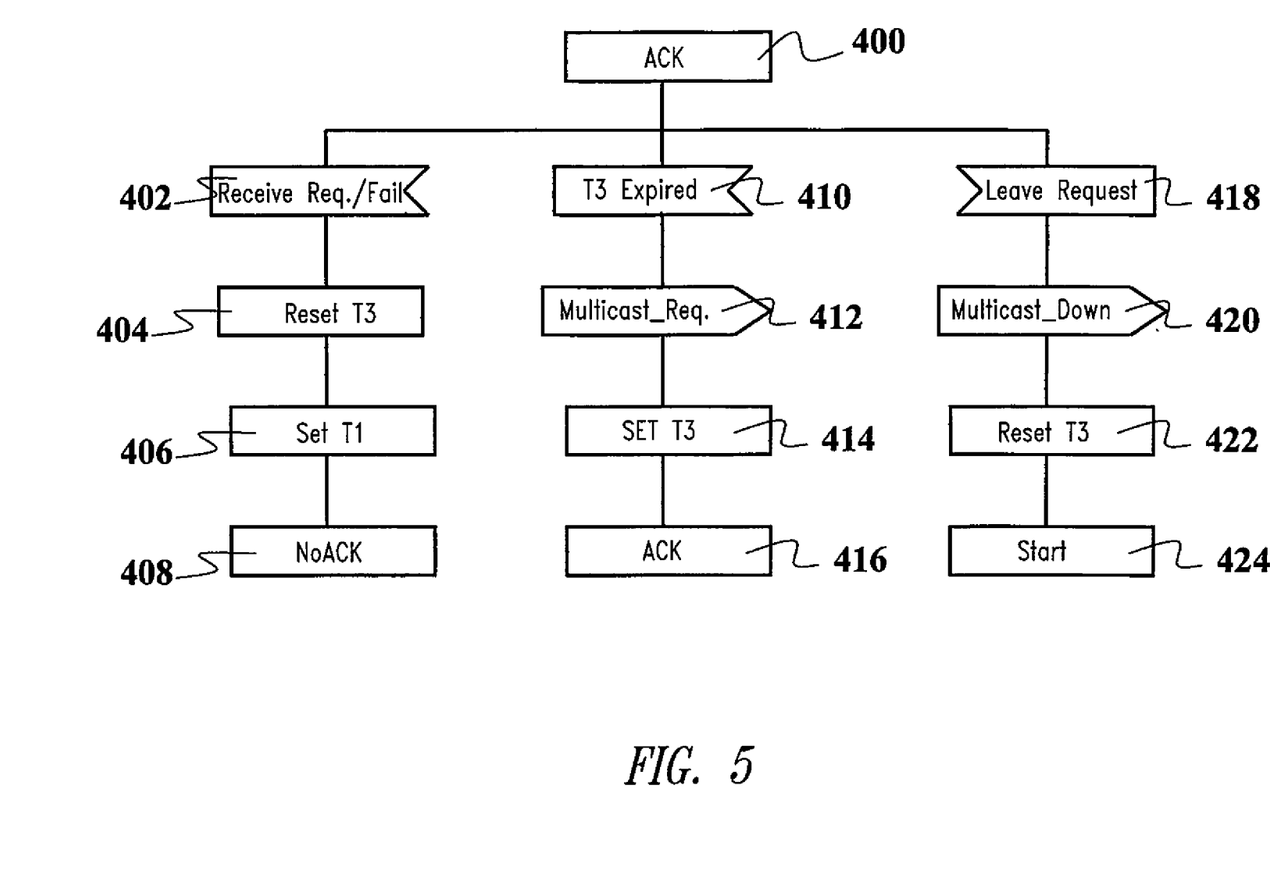
Figure 6:
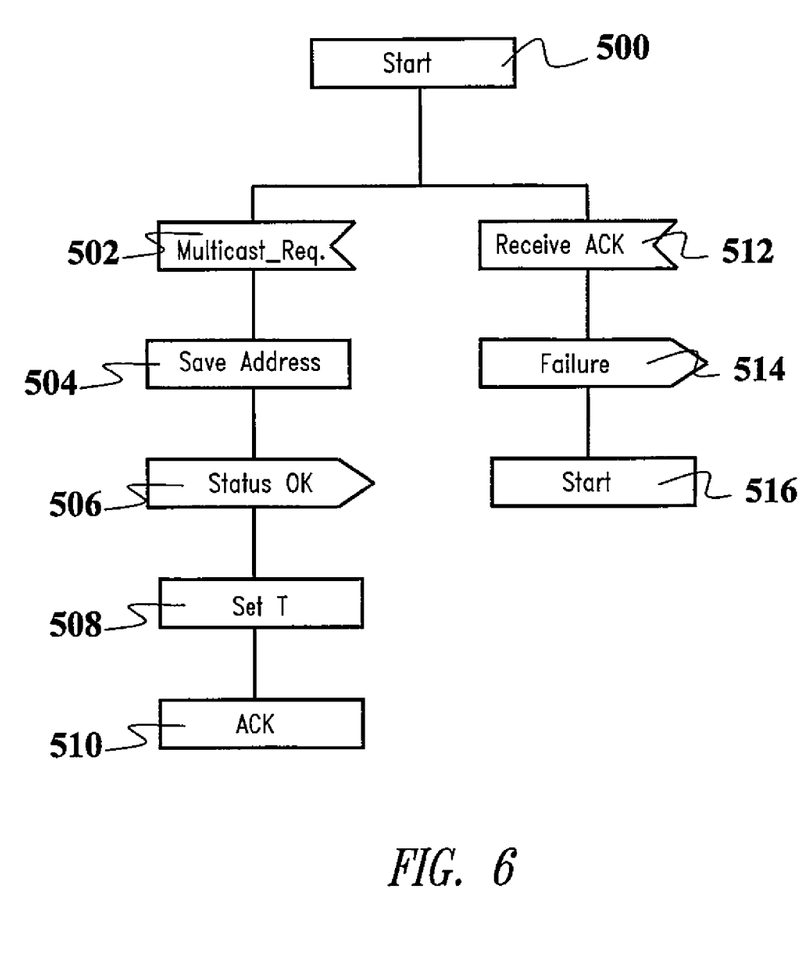
Figure 7:
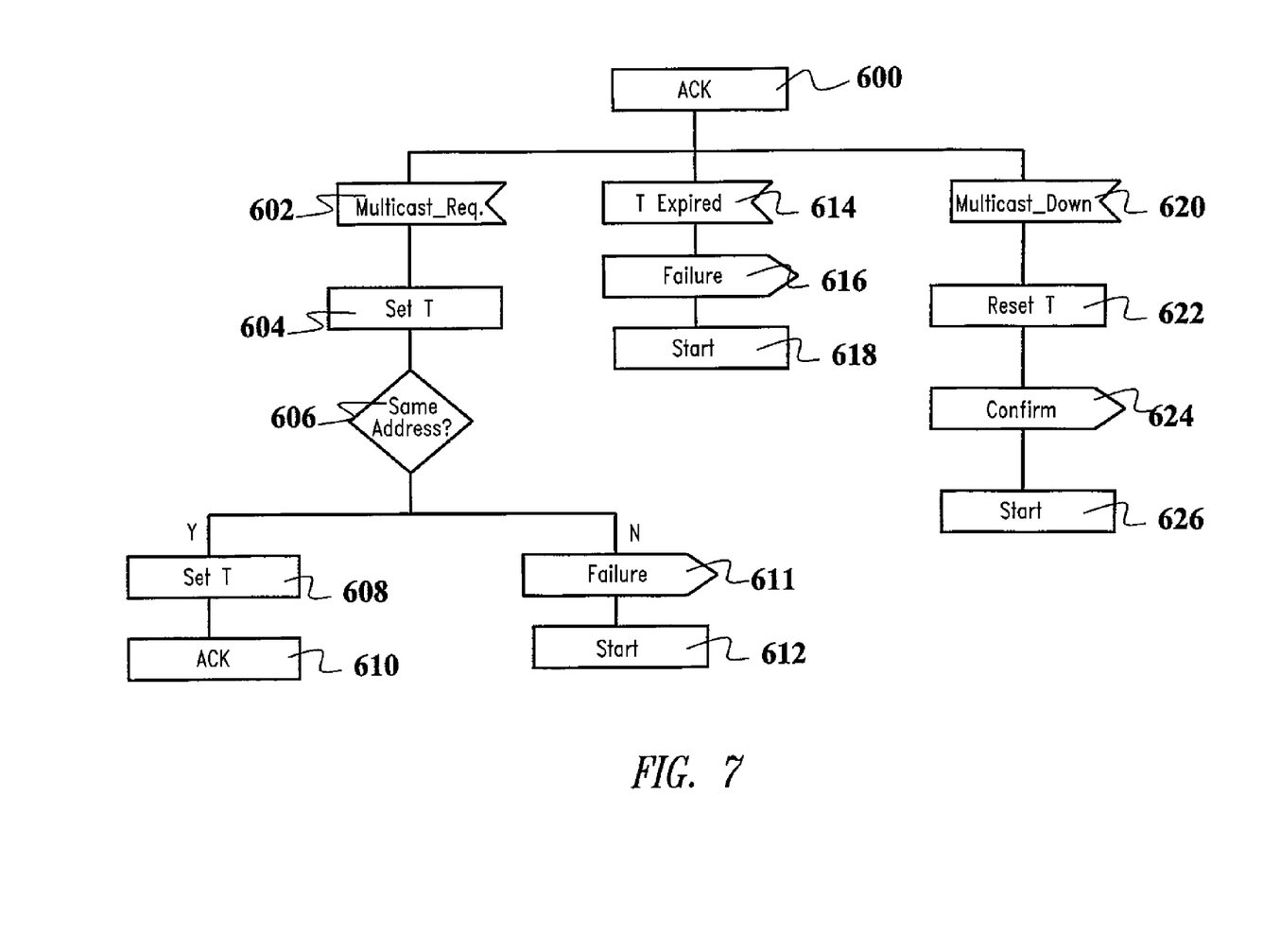

FIGS. 2 to 5 represent the operations of the Multicast Station; FIGS. 6 and 7 represent the operations of the Multicast Access Point.

The figures use SDL (Specification and Description Language) formalism.

Host Messages (exchanged between MAC and host operating system):
OS Multicast Join
  Sent by the host operating system to the MAC when the host wants to join a given IP multicast group.
OS Multicast Leave
  Sent by the host operating system to the MAC when the host wants to leave a given IP multicast group.

MAC Messages:
MULTICAST_REQ
  Sent by Multicast Stations to request the permission to send MAC layer ACKs for multicast frames addressed to a given MAC multicast address.
MULTICAST_RESP
  Sent by the Multicast Access Point to accept or reject MULTICAST_REQ frames sent by Multicast Stations. Status OK means that the request has been accepted; Status FAILURE means that the request has been rejected.
MULTICAST_DOWN
  Sent by Multicast Stations to signal that they are no longer interested in multicast frames addressed to a given MAC multicast address.
MULTICAST_DOWN_CNF
  Sent by the Multicast Access Point to confirm MULTICAST_DOWN frames sent by Multicast Stations.
Timers of Multicast Station:
T1
  This timer is needed to avoid Multicast Stations sending MULTICAST_REQ frame at the same time.
T2
  This timer is needed to limit the maximum time that the Multicast Station shall wait for a reply to a MULTICAST_REQ frame.
T3
  This timer is needed to send MULTICAST_REQ frame periodically.
Timers of Multicast Access Point:
T
  This timer is needed to detect failures of Multicast Stations.
States of Multicast Station:
Start State
  The initial state for the Multicast Station. In this state the Multicast Station has not joined any IP multicast group.
Multicast NoACK
  In this state the Multicast Station has joined an IP multicast group and it is not allowed to send MAC layer ACKs for multicast frames.
Multicast Ack
  In this state the Multicast Station shall send MAC layer ACKs for multicast frames addressed to the MAC multicast address specified in the MULTICAST_REQ frame.
Wait Resp
  In this state the Multicast Station is waiting for the Multicast Access Point to reply to MULTICAST_REQ frame.
States of Multicast Access Point:
Start State
  The initial state for the Multicast Access Point. In this state no Multicast Station is allowed to send MAC layer ACKs for multicast frames.
  Multicast Ack
In this state there is just a single Multicast Station for a given MAC multicast address. The Multicast Station shall send MAC layer ACKs for multicast frames.
Multicast Station Operation
After initialization, the Multicast Station is in Start State (step 100—FIG. 2).

Figure 2:
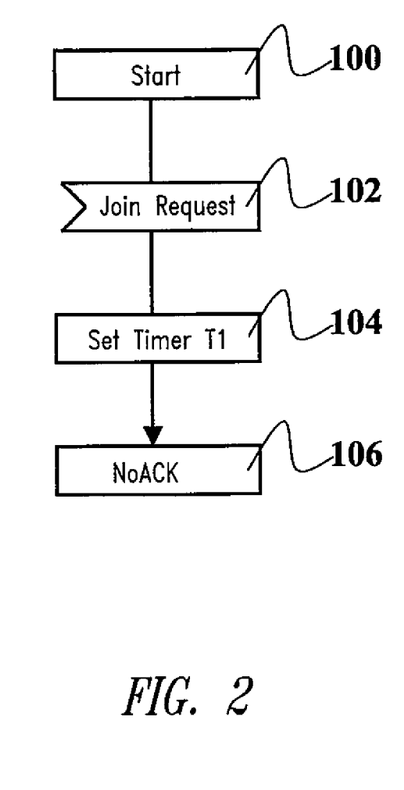
FIGS. 2 to 7 are flow diagram of the solution described herein.
Figure 3:
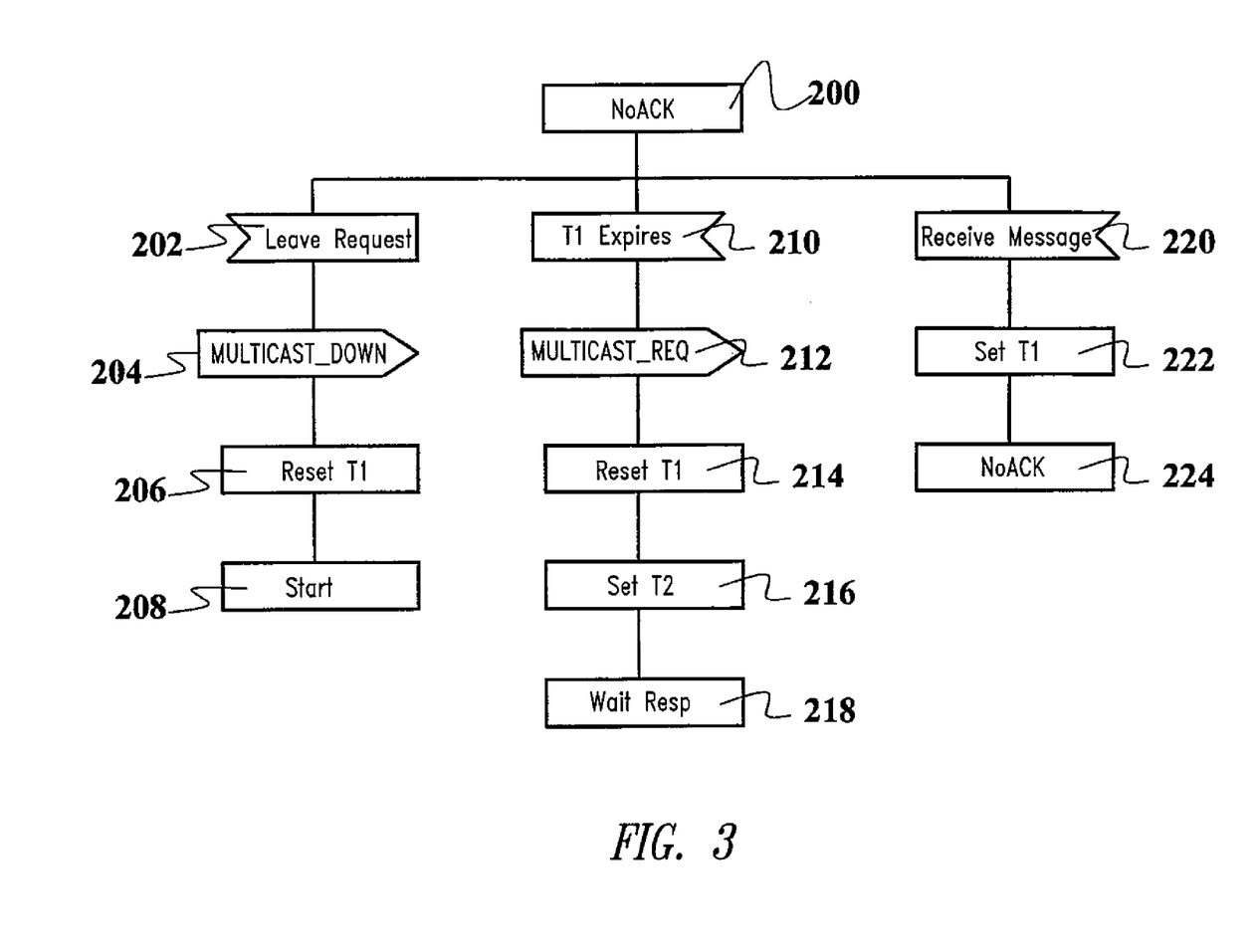

When the operating system of the Multicast Station requests to join a given network layer multicast group (step 102), the Multicast Station sets a timer T1 (step 104) and enters the Multicast NoACK State (steps 106 and 200—FIG.

3). In the Multicast NoACK State, the Multicast Station is not allowed to send ACKs for multicast frames.

After timer T1 expiration (step 210), the Multicast Station sends to the Multicast Access Point a proprietary management frame called MULTICAST_REQ (step 212), requesting packet loss reduction for packets addressed to a given Medium Access Control multicast address. After that, the Multicast Station resets timer T1 (step 214), then it sets a new timer T2 (step 216) and enters the Wait Resp State (steps 218 and 300).

If the Multicast Station receives MULTICAST_REQ, or MULTICAST_RESP, or MULTICAST_DOWN or MULTICAST_DOWN_CNF message (step 220) during Multicast NoACK State, then it shall set timer T1 again (step 222) without changing its current state (i.e., remaining in Multicast NoACK State, step 224): a Multicast Station that has received a multicast related management frame (i.e., MULTICAST_REQ, MULTICAST_RESP, MULTICAST_DOWN, MULTICAST_DOWN_CNF) for a given Media Access Control multicast address, is allowed to send a new MULTICAST_REQ for that address only after a certain time interval (given by timer T1). It is forbidden to send a new MULTICAST_REQ for the same address before timer T1 has expired.

If the operating system of the Multicast Station requests to leave the multicast group (step 202) during the Multicast NoACK State, the Multicast Station sends MULTICAST_DOWN frame to the MAC multicast address (step 204), resets timer T1 (step 206) and enters the Start State (steps 208).

The purpose of timer T1 is to avoid that Multicast Stations may send superposing MULTICAST_REQ messages at the same time. Each Multicast Station shall use a time interval for T1 computed as the sum of two values, a fixed one and a random one. The fixed value is set to 1000 ms. The random value is computed in this way:

extract a random value for the time interval to wait between zero and 802_11_MULTICAST_REQ_TIMEOUT (defined in a 802.11 Media Access Control Management Information Base (MIB) extension and communicated by the Multicast Access Point to Multicast Stations in beacon frames).

This time interval can be fine-tuned keeping into account dynamicity of multicast group membership. The larger is the value, the less is the traffic for multicast related management frames.

The purpose of timer T2 is limiting the maximum time that the Multicast Station shall wait for a reply to its MULTICAST_REQ frame.

The MULTICAST_REQ frame is addressed to the same Medium Access Control multicast address specified in the request, so that other Multicast Stations interested in that address can receive it.

When the Multicast Station is in Wait Resp State (step 300), it is waiting for the Multicast Access Point to reply to MULTICAST_REQ frame. In this state the Multicast Station shall handle three different events: reception of MULTICAST_RESP Status OK (step 302), reception of MULTICAST_RESP Status FAILURE (step 312) or timer T2 expiration (step 310).

If the Multicast Station receives a MULTICAST_RESP Status OK (step 302), it resets timer T2 (step 304), sets timer T3 (step 306) and enters the Multicast Ack State (step 308 and 400).

If the Multicast Station receives a MULTICAST_RESP Status FAILURE (step 312) or if timer T2 expires (step 310), then the Multicast Station resets timer T2 (step 314), sets timer T1 (step 316) and enters Multicast NoACK State (step 318).

When the Multicast Station is in Multicast Ack State (step 400), it shall send MAC layer ACKs for multicast frames addressed to the MAC multicast address specified in the MULTICAST_REQ frame previously sent by this station.

During this state, if the Multicast Station receives MULTICAST_RESP Status FAILURE or MULTICAST_REQ addressed to the same MAC multicast address (step 402), it means that there is more than one receiver for that multicast address within the same infrastructure Basic Service Set BSS. In such a case, the Multicast Station resets timer T3 (step 404), sets timer T1 (step 406) and enters Multicast NoACK State (step 408). If the operating system of the Multicast Station requests to leave the multicast group (step 418) during the Multicast Ack State, the Multicast Station sends MULTICAST_DOWN frame to the MAC multicast address (step 420), resets timer T3 (step 422) and enters the Start State (steps 424).

A Multicast Station may go out of range, or it may crash. To handle such possibilities, the Multicast Station that has received MULTICAST_RESP status OK shall periodically send MULTICAST_REQ to confirm that it is active. Periodic sending of MULTICAST_REQ is controlled by timer T3. Upon expiration of T3 (step 410), the Multicast Station sends MULTICAST_REQ (step 412) and sets T3 again (step 414) without changing its current state (i.e., remaining in Multicast Ack State, step 416).

Multicast Access Point Operation

After initialization, the Multicast Access Point is in Start State (step 500—FIG. 6).

Upon receipt of MULTICAST_REQ (step 502), if the Multicast Access Point is in Start State, it saves the MAC address of the requesting station (step 504) and accepts such a request by sending a proprietary reply management frame called MULTICAST_RESP status OK (step 506). After that, the Multicast Access Point sets a timer T (step 508) and enters the Multicast Ack State (steps 510 and 600).

MULTICAST_RESP (status OK) frame is addressed to that Medium Access Control multicast address, so that other potential Multicast Stations interested in that address can receive this message.

Upon receipt of ACKs for multicast frames while in its Start State (step 512), the Multicast Access Point shall send MULTICAST_RESP status FAILURE (step 514) to that multicast Medium Access Control address, without changing its current state (i.e., remaining in Start State, step 516).

During the Multicast Ack State (step 600), if the Multicast Access Point receives a MULTICAST_REQ (step 602), it shall reset timer T (step 604) and check if the MAC address of the sender is the same as the address saved in 504 (step 606).

If the address is the same, then the Multicast Access Point shall set timer T again (step 608) and remain in the same state (i.e., Multicast Ack State, step 610).

On the other side, if the MAC address of the sender is different from the address saved in 504, it means that there is more than one receiver for that multicast address within the same infrastructure Basic Service Set BSS: the Multicast Access Point shall refuse the Multicast Station request by sending a MULTICAST_RESP status FAILURE management frame (step 611) addressed to that multicast Medium Access Control address. After that, the Multicast Access Point will return in its Start State (step 612). The MULTICAST_RESP (status FAILURE) is sent in multicast so that each Multicast Station interested in that Medium Access Control multicast address can receive the frame. Consequently, all Multicast Stations (including the one whose MAC address has been saved in 504) are not allowed to send Acknowledgments for packets addressed to that Medium Access Control multicast address and The Multicast Access Pointwill not retransmit the corresponding data frames (behaving exactly as specified in 802.11 standard).

If the Multicast Access Point has accepted the Multicast Station request for a given Medium Access Control multicast address, then the Multicast Station shall send 802.11 Acknowledgments to indicate correct reception of multicast frames addressed to that multicast address, even if 802.11 standard forbids Acknowledgments for multicast frames.

The Multicast Access Point will adjust the value of "duration" field in each frame transmitted to that Medium Access Control multicast address to take into account the subsequent Acknowledgment. This means that the Multicast Access Point will behave exactly as if it were transmitting a unicast frame. The only difference is that the Destination Address (DA) is a multicast address.

If the Multicast Access Point does not receive an Acknowledgment, it will retransmit the corresponding data frame, but it will address the retransmitted data frame to the Multicast Station only, that is the unicast MAC address of the Multicast Station.

If the Multicast Access Point does not receive any MULTICAST_REQ from the Multicast Station after timer T expiration (step 614), then it will assume that the Multicast Station is no longer active. In this case the Multicast Access Point shall send a MULTICAST_RESP status FAILURE (step 616) management frame addressed to that multicast Media Access Control address and it will return to Start State (step 618).

When the Multicast Station that has received a MULTICAST_RESP status OK decides to leave the multicast group, it shall send a MULTICAST_DOWN management frame to the corresponding Medium Access Control multicast address.

Upon receipt of MULTICAST_DOWN (step 620), the Multicast Access Point will reset its timer T (step 622), confirm by sending a MULTICAST_DOWN_CNF (step 624) to that Medium Access Control multicast address and return to Start State (step 626).

The Multicast Stations and the Multicast Access Point shall not send ACKs for multicast related management frames (i.e., MULTICAST_REQ, MULTICAST_RESP, MULTICAST_DOWN and MULTICAST_DOWN_CNF).

The Multicast Access Point and the Multicast Stations can detect existence of other receivers in the same Basic Service Set for a given Medium Access Control multicast address by:
1) receiving a MULTICAST_REQ or a MULTICAST_RESP management frame from another Multicast Station (this has already been discussed in detail);
2) receiving Internet Group Management Protocol (IGMP) packet (IGMP snooping) for IPv4 or performing Multicast Listener Discovery (MLD) for IPv6.

The second option requires more computational effort than the first one, and so it is optional.

The first option is sufficient when all the stations associated to The Multicast Access Pointare Multicast Stations.

The arrangement described herein can operate correctly even if the second option is disabled and some non-MSTA stations are associated to a Multicast Access Point. In fact, ACK implosion problem is still avoided: ACKs will be generated only by the Multicast Station that has received the MULTICAST_RESP (status OK) management frame. Non-MSTA stations will not generate ACKs for multicast frames.

When the Multicast Access Point detects the existence of more than one receiver for a given Media Access Control multicast address, it shall send a MULTICAST_RESP (status FAILURE) frame addressed to that Medium Access Control multicast address.

The Multicast Stations and the Multicast Access Point may optionally specify their support for this solution by adding a flag into capability information field of 802.11 association request management frame (for Multicast Stations) and of 802.11 beacon (for Multicast Access Point).

Multicast data frames sent according to this solution, shall follow the encryption scheme specified by 802.11 (and its security amendments) for multicast transmissions.

In the following the 802.11 Medium Access Control Management Information Base extensions are reported.

1) 802_11_MULTICAST_ACK_ENABLED.
   Defined both for Multicast Access Point and Multicast Station.
   Boolean variable.
   If True, Acknowledgments for multicast frames are allowed and the rules specified in this invention must be followed.
   If False, Acknowledgments for multicast frames are forbidden and the rules specified in 802.11 standard must be followed.
   Default value is True.
2) 802_11_IGMP_SNOOPING_ENABLED.
   Defined both for Multicast Access Point and Multicast Station.
   Boolean variable.
   If True, Internet Group Management Protocol snooping (for IPv4, or MLD for IPv6) is enabled.
   If False, Internet Group Management Protocol snooping (for IPv4, or MLD for IPv6) is disabled.
   Default value is False.
Multicast Access Point case
   If Internet Group Management Protocol snooping (for IPv4, or MLD for IPv6) is enabled, the Multicast Access Point will analyze each Internet Group Management Protocol packet (for IPv4, or use Multicast Listener Discovery (MLD) for IPv6) to detect existence of more than one receiver for a given Internet Protocol multicast address (mapped to a Medium Access Control multicast address according to 802.11 standard) within the same Basic Service Set.
   Upon detection of more than one receiver for a given Medium Access Control multicast address, the Multicast Access Point shall send a MULTICAST_RESP (status FAILURE) to that Medium Access Control multicast address.
Multicast Station case
   If Internet Group Management Protocol snooping (for IPv4, or MLD for IPv6) is enabled, the Multicast Station will analyze each Internet Group Management Protocol packet (for IPv4, or use MLD for IPv6) to detect existence of more than one receiver for a given Internet Protocol multicast address (mapped to a Medium Access Control multicast address according to 802.11 standard) within the same Basic Service Set.
   Upon detection of more than one receiver for a given Medium Access Control multicast address, Multicast Station must not send a MULTICAST_REQ for that multicast Medium Access Control address.
3) 802_11_MULTICAST_REQ_TIMEOUT.
   Unsigned Integer variable.
   Defined both for Multicast Access Point and Multicast Station.
   The value of this variable is the maximum time interval (in time units, i.e., 1024 us) that a Multicast Station must wait after having received a multicast related management frame (i.e., MULTICAST_REQ, MULTI- CAST_RESP, MULTICAST_DOWN, MULTICAST_DOWN_CNF) for a given Basic Service Set multicast address, before sending a MULTICAST_REQ for the same Medium Access Control multicast address. To avoid Multicast Station sending a MULTICAST_REQ at the same time, each Multicast Station shall use a time interval computed extracting a random value for the time interval between zero and 802_11_MULTICAST_REQ_TIMEOUT. The value is communicated by the Multicast Access Point to the Multicast Stations in beacon frames.

Default value is 10000.

It is quite easy to detect if other parties are using this invention. Indeed the invention specifies use of additional management messages and of ACKs for multicast packets. If another wireless MAC were using similar techniques, an ISO OSI layer 2 network protocol analyzer (sniffer) could easily highlight it.

For example, in the 802.11 embodiment, a sniffer such as Ethereal allows detection of 802.11 management frames and of 802.11 Acknowledgments.

This solution provides packet loss reduction at Medium Access Control layer for multicast transmissions when in a WLAN there is just a single receiver for a given Internet Protocol multicast group.

This technique can be integrated in Medium Access Control implementations to reduce multicast packet loss and increase channel utilization efficiency, thereby providing product differentiation with respect to standard WLAN equipment.

The solution described herein can be implemented in existing 802.11 chipsets (e.g., in the Mercury chipset currently available from STMicroelectronics), by updating the Medium Access Control firmware. This way, cost investment of customers is preserved: there is no need to buy new hardware to exploit the benefits of this solution.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method, comprising:
controlling transmission of multicast packets over a local area network, the controlling including:
identifying a condition where only a single receiver exists within said local area network for a given multicast group of packets, and
transmitting a signal, in response to the identifying of said condition, authorizing the single receiver to switch from a condition in which automatic repeat requesting is unauthorized to a condition allowing the single receiver to perform automatic repeat requesting the packets multicast towards said single receiver.

2. The method of claim 1, wherein said local area network is a wireless local area network.

3. The method of claim 1, wherein said automatic repeat requesting involves allowing acknowledgement messages to be accepted from said single receiver.

4. The method of claim 1, wherein the automatic repeat requesting the packets includes Medium Access Control layer retransmissions of packets in said multicast group of packets.

5. The method of claim 1, comprising:
multicasting said multicast packets in said local area network via a multicast access point;
receiving at the multicast access point, from a requesting multicast station of a plurality of multicast stations of said local area network, a management frame that includes a request for packet loss reduction for packets addressed to a given multicast address, wherein said management frame is addressed to the given multicast address specified in said request, enabling other multicast stations associated with said given multicast address to receive the request, and
accepting said request at said multicast access point if there are no other known multicast stations for said given multicast address within said network.

6. The method of claim 5, further comprising said multicast access point refusing said request by sending a failure frame addressed to said given multicast address.

7. The method of claim 5, wherein, if said multicast access point accepts said request, the method includes said multicast access point accepting from said requesting multicast station acknowledgment messages to indicate correct reception of multicast packets addressed to the given multicast address.

8. The method of claim 7, further comprising said multicast access point adjusting a duration field value in each frame transmitted to said given multicast address to take into account a subsequent acknowledgment message, and, if said multiple access point does not receive said subsequent acknowledgment message, said multicast access point retransmitting a corresponding data frame by addressing the corresponding data frame to said requesting multicast station.

9. The method of claim 8 wherein, if said multicast access point has accepted said request, said multicast access point adjusting the duration field value in the frames transmitted to said given multicast address to take into account possible subsequent acknowledgment messages, whereby said multicast access point behaves as if transmitting a unicast frame.

10. The method of claim 8 wherein, if said multicast access point does not receive any acknowledgment message from said requesting multicast station, the method includes retransmitting the corresponding data frame.

11. The method of claim 10, wherein the retransmitting includes addressing said corresponding data frame only to said requesting multicast station.

12. The method of claim 7, further comprising said multicast access point detecting the existence of more than one receiver for the given multicast address and said multicast access point sending a failure frame addressed to said given multicast address thereby preventing said multicast stations from obtaining retransmission of multicast packets.

13. A device, comprising:
first means for controlling transmission of multicast packets over a local area network, the first means comprising:
second means for identifying a condition where only a single receiver exists within said local area network for a given multicast group of packets, and
third means for transmitting a signal, in response to the identifying of said condition, authorizing the single receiver to switch from a condition in which automatic repeat requesting is unauthorized to a condition allowing the single receiver to perform automatic repeat requesting the packets multicast towards said single receiver.

14. The device of claim 13, further comprising fourth means for allowing acknowledgement messages to be accepted from said single receiver.

15. The device of claim 13, wherein said third means includes a Medium Access Control layer structured to retransmit packets in said multicast group of packets.

16. The device of claim 13, comprising:
fifth means for multicasting said multicast packets in said local area network;

sixth means for receiving from a requesting multicast station a management frame that includes a request for packet loss reduction for packets addressed to a given multicast address, wherein said management frame is addressed to the given multicast address specified in said request, whereby other multicast stations interested in said given multicast address can receive the request, and seventh means for accepting said request if there are no other known receivers for said given multicast address within said network.

17. The device of claim 13, wherein the device is a multicast access point.

18. A system, comprising:
a multicast transmission controller structured to control transmission of multicast packets over a local area network, the controller being configured to identify a condition where only a single receiver exists within said local area network for a given multicast group of packets, and in response to identifying of said condition, produce a signal authorizing the single receiver to switch from a condition in which automatic repeat requesting is unauthorized to a condition allowing the single receiver to perform automatic repeat requesting; and
a transmitter configured to transmit to the single receiver the signal authorizing automatic repeat requesting the packets multicast towards said single receiver.

19. The system of claim 18, further comprising the local area network.

20. The system of claim 19 wherein the local area network is a wireless local area network.

21. A non-transitory computer-readable medium including code portions for causing a processor to implement a method comprising:
controlling transmission of multicast packets over a local area network, the controlling including:
identifying a condition where only a single receiver exists within said local area network for a given multicast group of packets, and
transmitting a signal, in response to the identifying of said condition, authorizing the single receiver to switch from a condition in which automatic repeat requesting is unauthorized to a condition allowing the single receiver to perform automatic repeat requesting the packets multicast towards said single receiver.

22. The non-transitory computer-readable medium of claim 21, wherein said automatic repeat requesting involves allowing acknowledgement messages to be accepted from said single receiver.

23. The non-transitory computer-readable medium of claim 21, wherein automatic repeat requesting involves Medium Access Control layer retransmissions of packets in said multicast group of packets.

24. The non-transitory computer-readable medium of claim 21, wherein the method further comprises:
multicasting said multicast packets in said local area network via a multicast access point;
receiving at the multicast access point, from a requesting multicast station of a plurality of multicast stations of said local area network, a management frame that includes a request for packet loss reduction for packets addressed to a given multicast address, wherein said management frame is addressed to the given multicast address specified in said request, whereby other multicast stations interested in said given multicast address can receive the request, and accepting said request at said multicast access point if there are no other known multicast stations for said given multicast address within said network.

25. The non-transitory computer-readable medium of claim 21, wherein the method further comprises:
preventing, when plural receivers exist within said local area network for the given multicast group of packets, the plural receivers from obtaining retransmission of multicast packets, the preventing including sending to the plural receivers one or more messages indicating that automatic repeat requesting is not authorized.

26. The method of claim 1, further comprising:
preventing, when plural receivers exist within said local area network for the multicast group of packets, the plural receivers from obtaining retransmission of multicast packets, the preventing including sending to the plural receivers one or more messages indicating that automatic repeat requesting is not authorized.

27. The system of claim 18, wherein the multicast transmission controller is configured to prevent, when plural receivers exist within said local area network for the multicast group of packets, the plural receivers from obtaining retransmission of multicast packets, the multicast transmission controller being configured cause the transmitter to send to the plural receivers one or more messages indicating that automatic repeat requesting is not authorized.

28. The system of claim 18, wherein the multicast transmission controller and transmitter are parts of a multicast access point, the multicast access point being configured to:
receive, from a requesting multicast station of a plurality of multicast stations of said local area network, a management frame that includes a request for packet loss reduction for packets addressed to a given multicast address, wherein said management frame is addressed to the given multicast address specified in said request, enabling other multicast stations associated with said given multicast address to receive the request;
accept said request if there are no other known multicast stations for said given multicast address within said network;
accept from said requesting multicast station acknowledgment messages to indicate correct reception of multicast packets addressed to the given multicast address;
adjust a duration field value in each frame transmitted to said given multicast address to take into account a subsequent acknowledgment message; and,
if said multiple access point does not receive said subsequent acknowledgment message, retransmit a corresponding data frame by addressing the corresponding data frame to said requesting multicast station.

29. non-transitory computer-readable medium of claim 21, wherein the method further comprises:
multicasting said multicast packets in said local area network via a multicast access point;
receiving at the multicast access point, from a requesting multicast station of a plurality of multicast stations of said local area network, a management frame that includes a request for packet loss reduction for packets addressed to a given multicast address, wherein said management frame is addressed to the given multicast address specified in said request, enabling other multicast stations associated with said given multicast address to receive the request;
accepting said request at said multicast access point if there are no other known multicast stations for said given multicast address within said network;

in response to accepting said request, said multicast access point accepting from said requesting multicast station acknowledgment messages to indicate correct reception of multicast packets addressed to the given multicast address;

said multicast access point adjusting a duration field value in each frame transmitted to said given multicast address to take into account a subsequent acknowledgment message; and, if said multiple access point does not receive said subsequent acknowledgment message, said multicast access point retransmitting a corresponding data frame by addressing the corresponding data frame to said requesting multicast station.

* * * * *